April 24, 1934.  H. W. ROMANOFF  1,955,833
BUILDING MATERIAL
Filed June 17, 1931
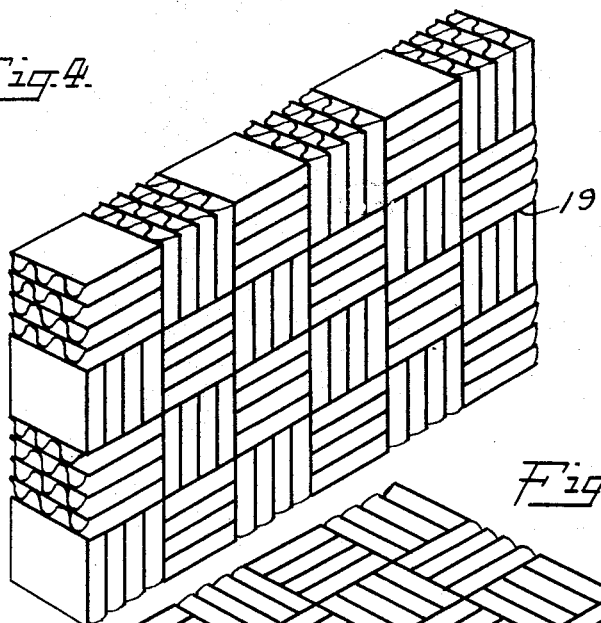
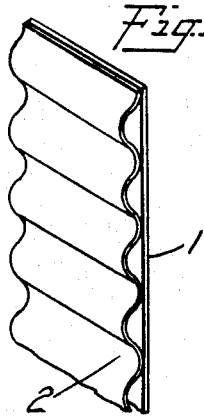
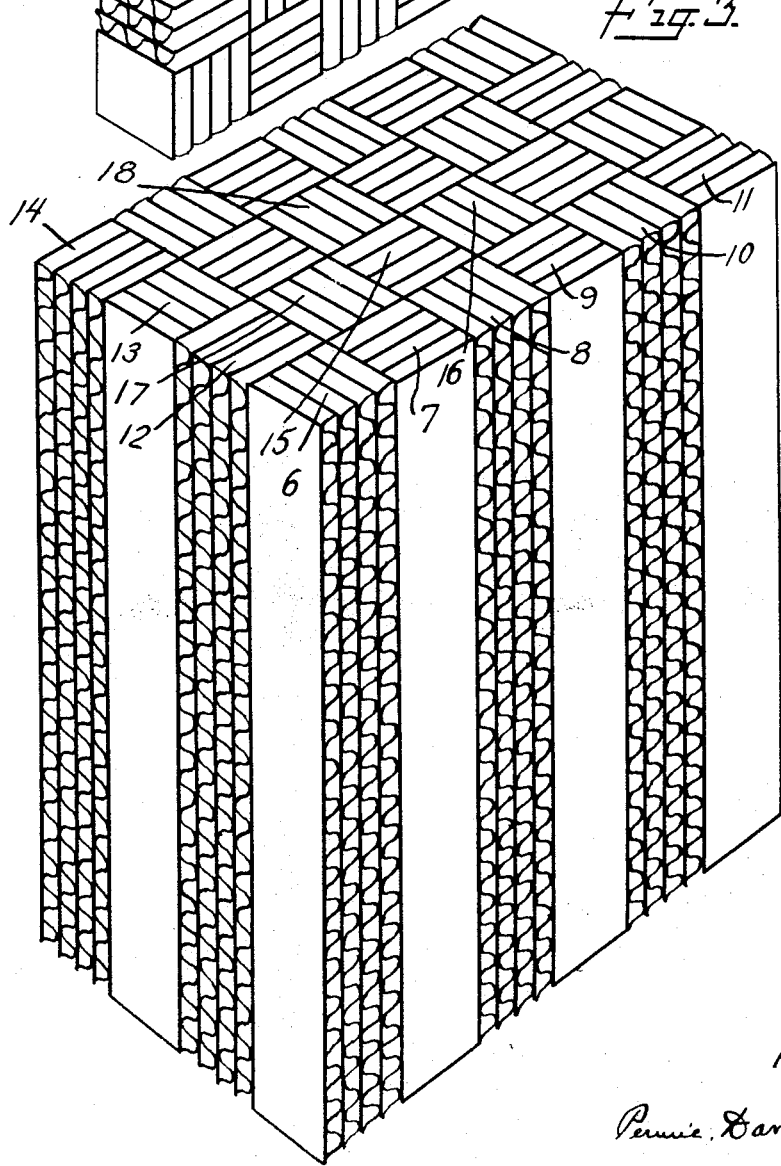
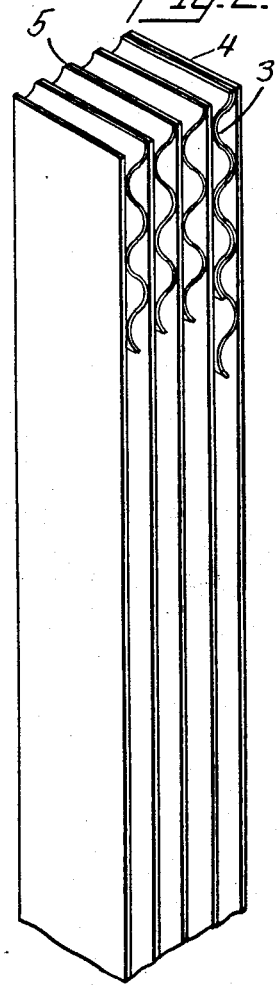
INVENTOR
H. W. Romanoff
BY
Pennie, Davis, Marvin & Edmonds
ATTORNEYS Patented Apr. 24, 1934

1,955,833

UNITED STATES PATENT OFFICE 1,955,833

BUILDING MATERIAL

Hippolyte W. Romanoff, New York, N. Y., assignor to Aerolite Company Inc., New York, N. Y.

Application June 17, 1931, Serial No. 545,022

4 Claims. (Cl. 20—91)

This invention relates to the manufacture of a substitute for lumber, steel or other building material which may be employed in the erection of interior or exterior walls of houses, small buildings or the like, or in the manufacture of furniture, table tops or other articles usually made of wood.

The improved product forming the subject matter of my invention is formed of a plurality of units consisting of plies of corrugated board. I am aware of prior attempts to employ corrugated board in the manufacture of wall boards and similar products but in such prior attempts the sheets of corrugated board have been fabricated in such manner that the product has lacked strength and has possessed none of the advantages herein described.

In making the product of the present invention I first form a plurality of units, each of which consists of a number of layers of corrugated board. These units are assembled to produce the desired product with the corrugations of each unit extending at right angles to the corrugations of adjacent units. A product made in this manner possesses unusual strength as the units with the corrugations running in different directions give the finished product necessary resistance to strains or stresses applied in any direction.

The product may be impregnated or coated with various substances such as gypsum, animal or vegetable glue or the like and the units may be wrapped in paper or other fabric covering to increase their stiffness and strength. The product is light in weight and can be used to advantage in the manufacture of interior building walls and in the manufacture of various pieces of furniture, and when suitably treated to make it waterproof, it may be used for exterior walls of buildings. By assembling the corrugated boards as described and cutting them into units and then producing the desired product from a plurality of such units with the corrugations of the adjacent units running at right angles to each other, I provide a product possessing strength never before obtainable by prior methods of fabricating corrugated boards.

In the accompanying drawing, I have shown several forms of the invention. In this showing, Fig. 1 is a perspective view of one layer or ply of corrugated board;

Fig. 2 is a similar view showing a plurality of the boards of Fig. 1 assembled to form a unit;

Fig. 3 is a perspective view of a product formed of a plurality of the units shown in Fig. 2; and Fig. 4 is a similar view of a product formed from a section of Fig. 3, and suitable for use as an insulating material, or the like.

Referring to the drawing, the reference numeral 1 designates a backing sheet or support and the reference numeral 2 designates a corrugated sheet or support mounted on the backing. The backing sheet and the corrugated sheet 2 produce the ordinary or usual corrugated sheet. In forming the unit of corrugated sheets a plurality of the sheets shown in Fig. 1 are used and these sheets are united to each other to form a unit of the desired thickness. They may be united in any suitable way, but I preferably form the unit shown in Fig. 2 by securing a number of sheets to each other by a suitable adhesive, such as animal or vegetable glue, sodium silicate or the like. When the adhesive dries, the sheets are firmly united to each other. As shown in Fig. 2, the corrugated sheets can be built up in any desired number to form a unit of a desired thickness. The corrugated sheets are placed one against the other with the backing sheet 1 of the second corrugated sheet secured to the corrugated member 2 of the first sheet. At the opposite end of the unit, indicated by the far side in Fig. 2 of the drawing, one of the corrugated sheets is placed in reverse position as indicated by the reference numeral 3 to position a backing sheet on each of the outsides of the unit. The units may be formed of any desired dimensions, and if the finished product is to be used in the building of walls, posts or columns, the unit is preferably formed of considerable length. The width of the unit is determined by the number of plies therein and the width indicated by the line 4 should be equal to the thickness determined by the number of plies and indicated by the reference numeral 5 so that the units are square in cross section. A number of these units are assembled to produce the product shown in Fig. 3 of the drawing. As shown, the length of the product is determined by the length of the units and the units may, of course, be cut to any desired size. The units of one row are arranged with the corrugations running at right angles to each other as indicated by the reference numerals 6, 7, 8, 9, 10 and 11. Likewise, the units of a row at right angles to the row formed by the units 6 to 11 are arranged with the corrugations running at right angles as indicated by the reference numerals 6, 12, 13 and 14. Any given unit in the center of the product is thus surrounded on all four sides by units with the corrugations running at right angles thereto as indicated by the unit 15, the unit 8, the unit 16, the unit 17 and the unit 18.

As stated above, the product may be used in building walls, posts, columns, joists or other structural units and may be formed of any desired width or thickness by assembling the desired number of the units shown in Fig. 2 of the drawing. The finished product possesses great strength as the sheets 1 extending in the direction of the length of the unit make it sufficiently strong to withstand any and all stresses or strains to which it may be subjected in this direction. Likewise, the arrangement of the corrugations of the separate units at right angles to each other gives the product unusual strength in both of its other directions. If the unit is to be employed as a filling for insulating materials in walls, refrigerators and the like, a section may be cut from the product shown in Fig. 3 of the drawing of any desired thickness producing a unit 19 shown in Fig. 4 of the drawing.

This product makes an excellent heat insulator due to the dead air spaces in the corrugations. As stated, the exterior of the product of Fig. 3 or Fig. 4 may be covered with a wrapping of paper or other suitable fabric or with a covering of thin wood to form a veneer finish or of thin metal. Likewise, the surfaces may be impregnated with gypsum or other materials to produce a weatherproof surface and to seal the corrugations at the surfaces. The various ways in which the surfaces thereof may be finished or decorated will be apparent to the man skilled in the art and a detailed description thereof is therefore believed to be unnecessary.

I claim:

1. The herein described product comprising a plurality of units of substantially the same shape and size each consisting of a plurality of corrugated sheets secured to each other so that the longitudinal axes of the corrugations are parallel, the units being secured together so that the longitudinal axes of the corrugations of one unit are at right angles to the longitudinal axes of the corrugations of each adjacent unit.

2. The herein described product comprising a plurality of units of substantially the same shape and size each consisting of a plurality of corrugated sheets secured to each other so that the longitudinal axes of the corrugations are parallel, the units being secured together so that the longitudinal axes of the corrugations of one unit are at right angles to the longitudinal axes of the corrugations of each adjacent unit, and so that the longitudinal openings in one unit formed by the corrugations are intercepted by the corrugated sheets of an adjacent unit and lying in planes normal to such openings.

3. The herein described product comprising a plurality of elongated prismatic units which are rectangular in cross section all of said units being of substantially the same shape and size and each of the units consisting of a plurality of corrugated sheets secured to each other so that the longitudinal axes of the corrugations are parallel, the units being secured together lengthwise and so that the longitudinal axes of the corrugations of one unit are at right angles to the longitudinal axes of the corrugations of each adjacent unit.

4. The herein described method which comprises securing together a plurality of corrugated sheets arranged with the longitudinal axes of the corrugations parallel to form a plurality of substantially similar units of elongated prismatic shape which are rectangular in cross section, securing a plurality of such units together lengthwise and so that the longitudinal axes of the corrugations of one unit are at right angles to the longitudinal axes of the corrugations of each adjacent unit, and then cutting the structure thus formed into sections transversely of said elongated units.

HIPPOLYTE W. ROMANOFF.